March 3, 1942.    J. A. CALDWELL    2,275,246
MEASURING INSTRUMENT
Filed Dec. 15, 1938    5 Sheets-Sheet 1

INVENTOR
JOHN A. CALDWELL
BY George M. Muselamp
ATTORNEY

March 3, 1942.　　　J. A. CALDWELL　　　2,275,246
MEASURING INSTRUMENT
Filed Dec. 15, 1938　　　5 Sheets-Sheet 2

INVENTOR
JOHN A. CALDWELL
BY *George M. ...*
ATTORNEY

March 3, 1942.  J. A. CALDWELL  2,275,246
MEASURING INSTRUMENT
Filed Dec. 15, 1938   5 Sheets-Sheet 3

INVENTOR
JOHN A. CALDWELL
BY
ATTORNEY

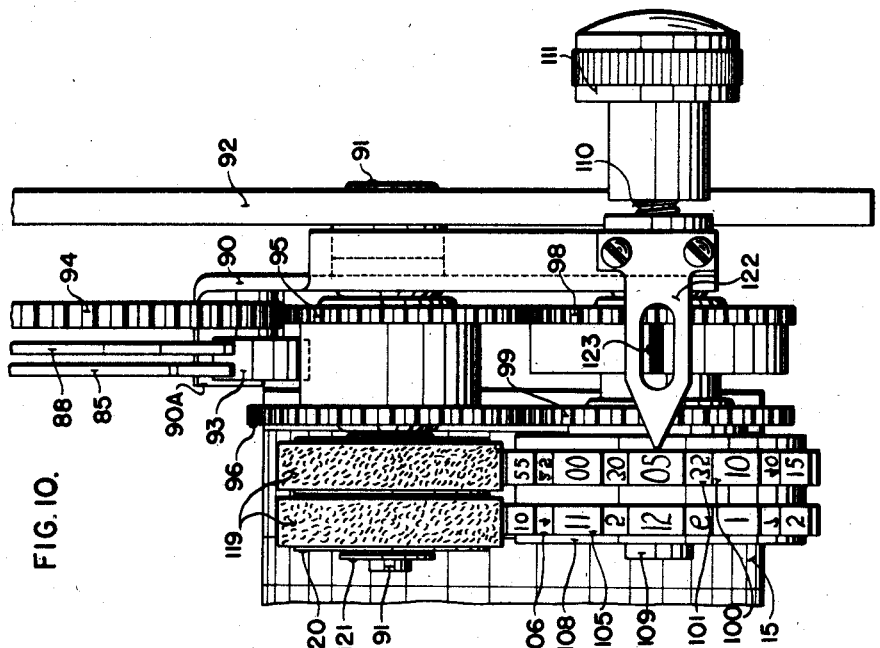

March 3, 1942.    J. A. CALDWELL    2,275,246
MEASURING INSTRUMENT
Filed Dec. 15, 1938    5 Sheets-Sheet 5

INVENTOR
JOHN A. CALDWELL
BY
ATTORNEY

Patented Mar. 3, 1942

2,275,246

UNITED STATES PATENT OFFICE 2,275,246

MEASURING INSTRUMENT

John A. Caldwell, Philadelphia, Pa., assignor to The Brown Instrument Company, Philadelphia, Pa., a corporation of Pennsylvania Application December 15, 1938, Serial No. 245,928

7 Claims. (Cl. 234—74)

The present invention relates to high speed measuring and recording apparatus in which it is desirable to obtain an accurate record of the value of the condition being measured and to obtain a knowledge of the time that the record was made.

In instruments of this type as the record is being made, if the value of the condition remains approximately constant, the chart upon which the record is recorded may be driven at a fairly low speed and the record will still be entirely legible. Upon the occurrence of sudden and large changes in the value of the condition, however, it is desirable to have a detailed knowledge of the changes and in order to obtain them the chart must be driven at a much higher rate of speed. Inasmuch as these changes may occur at any time it is desirable if not necessary that the change in chart speed be responsive to the alteration of the condition a predetermined amount from normal.

In the ordinary type of chart used on recording instruments the chart is provided with vertical lines to indicate the value of the condition and horizontal lines to indicate the time at which the record was made. If, however, the chart is driven at different speeds at irregular intervals the normal time lines become useless and some auxiliary means is necessary in order to indicate time on the chart.

It is an object of this invention to provide a multi-speed chart drive means and cooperating time marking means for the chart so that the proper time will be indicated on the chart regardless of the speed and therefore the amount of chart that is moved past the recording member in a given period of time.

It is an object of the invention to drive the chart at one speed, through suitable gearing, from a constantly rotating motor, and to drive the chart at another speed through the same gearing from a second intermittently operating motor. The latter motor may be operated in response to a change of the value of the condition being recorded beyond a given point.

It is a further object of the invention to provide an improved chart driving means that is actuated by a single reversible motor which, upon rotation in one direction is adapted to drive the chart at one speed, and upon rotation in a reverse direction to drive the chart at another speed. It is also an object of the invention to provide a means for reversing the drive motor upon the deviation of the value of the condition being measured by a predetermined amount.

Another object of the invention is to provide a means to mark the time of day on the chart at periodic intervals so that regardless of the speed of the chart the correct time of the record will always be indicated thereon.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 9 is a side view of the time printing device and its drive means;

Fig. 10 is a plan view of the printing mechanism on a larger scale;

Figure 1:
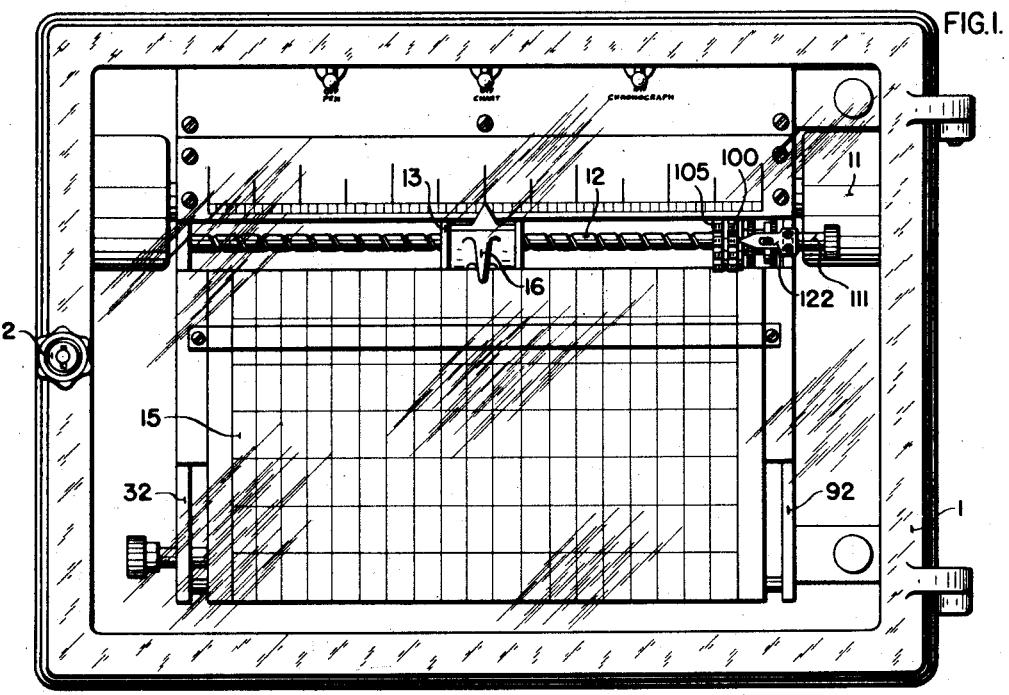
Fig. 1 is a front view of an instrument embodying my invention.

There is illustrated in Fig. 1, one form which an instrument of the present invention may take. The instrument is provided with some suitable casing that has a door 1 hinged at one side to the casing and provided at its other side with a combined knob and lock 2 by which the door may be opened to provide access to the mechanism in the casing. A glass window is in the door through which may be seen various of the essential parts of the mechanism which will be described in detail later.

Figure 2:
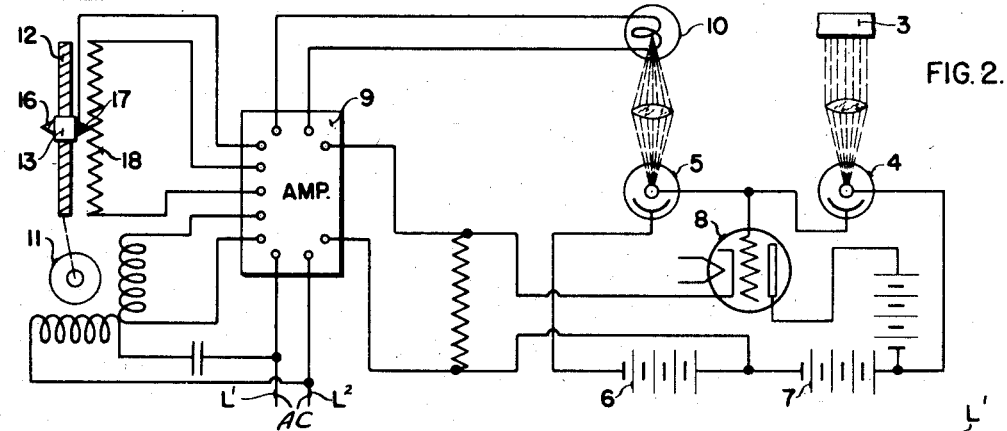
Figs. 2 and 3 are typical measuring circuits which may be used with an instrument of this type.

In Fig. 2 there is illustrated one form of measuring circuit that may be used with the mechanism of my invention to measure the value of the variable. An object which may, for example, be a hot billet passing through a rolling mill is indicated at 3 and has focused upon it by some suitable means, diagrammatically shown, a light sensitive device 4. This device is included in a bridge circuit having a pair of arms including the device 4 and a second light sensitive device 5, respectively, and another pair of arms including sources of potential 6 and 7, respectively. Connected to the equalizing terminals of the bridge is an electronic device 8, the input circuit of which is adapted to respond to bridge unbalance and the output circuit of which is connected to a further amplifier 9. The amplifier 9 is energized by conductors L¹ and L² and is adapted to control the current in a lamp 10 and to vary the current in a direction to increase or decrease its illumination. Accordingly, as the light from body 3 on the light sensitive device 4 is increased or decreased the illumination of the lamp 10, focused upon device 5, will be increased or decreased to automatically rebalance the bridge circuit.

The output of the electronic device 8 is adapted to be measured and recorded by the instrument embodying my invention by means of the amplifier 9 which preferably is an electronic motor control circuit of the type described in the Harrison application mentioned below for a recorder motor 11. This motor is caused to rotate in one direction or the other to rotate a helically threaded shaft 12 upon which is mounted a pen carriage 13. The carriage is provided with a roller 14 (see Fig. 5) bearing in the groove or thread on the shaft so that as the shaft rotates the carriage will be moved one way or the other along a chart 15. A pen 16 is mounted on the carriage to draw a line on the chart as they are relatively moved. Also mounted on the carriage 13 is a contact 17 which is shifted along a slidewire 18 generally in the manner set forth in the application Ser. No. 145,637 of Thomas R. Harrison filed May 29, 1937, now Patent 2,245,034, granted June 10, 1941. It is sufficient for the present purpose, as will be clear from the later description of Fig. 3, that the pen carriage 13 is driven at a relatively high rate of speed in accordance with variations in the temperature of the object 3, and the slide-wire 18 is included in a self balancing measuring circuit analogous to the slide-wire 18 of Fig. 3.

Figure 3:
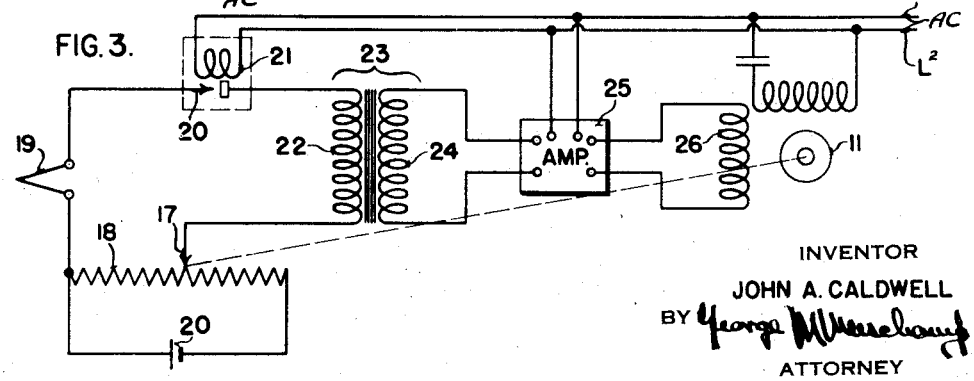

Fig. 3 illustrates a high speed measuring system that may be used alternatively to that shown in Fig. 2, in which a thermocouple 19, responsive to a temperature to be measured, is included in a potentiometric circuit. This circuit also includes a source of potential 20 and the slide-wire 18 connected across said source, the voltage of the thermocouple being opposed to the potential drop across a variable portion of the slide-wire 18 as determined by the position of contact 17 on the slide-wire.

Connected in series with the thermocouple 19 and contact 17 is a vibrator 20 energized by the vibrator mechanism 21 connected directly to the lines L¹ and L² and the primary winding 22 of a transformer 23. Vibrator 20 is adapted to open and close the thermocouple circuit in synchronism with the alternating current supply line thereby impressing upon transformer winding 22 a pulsating current in a direction and of a magnitude depending upon the direction and extent of potentiometer unbalance. Transformer secondary winding 24 is connected directly to an electronic amplifier 25, also energized by conductors L¹ and L², and the output of said amplifier is connected to one field winding 26 of the two phase motor 11, a second winding of which is connected directly to the line L¹ and L². Motor 11 will thus be energized for rotation in one direction or the other depending upon the phase in the winding 26 which will depend upon the direction of unbalance of the potentiometer circuit and the motor is so connected to the contact 17 as to move the latter in a direction to rebalance the potentiometer system.

As will be understood, the thermocouple 19 may be directly inserted in a furnace to measure the temperature thereof or may be the thermocouple or thermopile of a radiation pyrometer sighted on an object, the temperature of which is to be measured generally in the manner that the device 4 of Fig. 2 is utilized.

During the operation of the instrument, when no object, such as the billet 3 of Fig. 2, is passing the light sensitive device 4 the pen will be recording a low temperature value on the chart and will be positioned over the low or left end thereof in Fig. 1. At this time there will be no great variations in the position of the record line along the chart and no necessity for a fast chart speed. When, however, a billet passes beneath the device 4 the temperature of the billet would, through the measuring circuit, cause the motor 11 to rotate in a direction to move the pen up-scale to the right in Fig. 1. Since it is important that variations in the temperature of the billet be accurately shown by the record line the chart speed is increased. To this end any one of several types of chart drives may be used, the ones herein disclosed being driven by electric motors or an electric motor.

Figure 5:
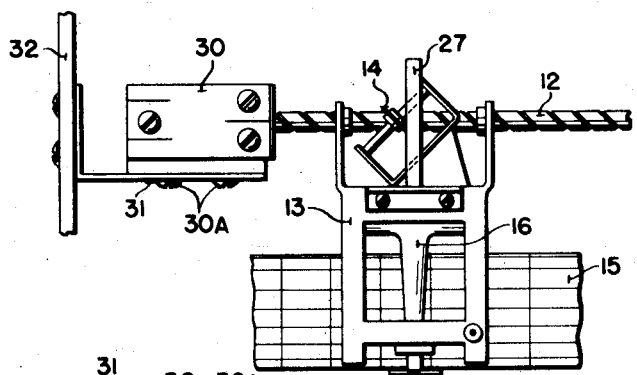
Fig. 5 is a plan view of the pen carriage showing the switch mechanism for the chart drive.
Figure 6:
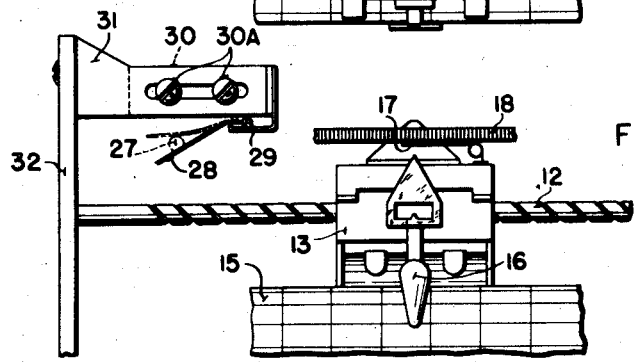
Fig. 6 is a front elevation view of the pen carriage and switch mechanism.

As shown in Figs. 5 and 6 the pen carriage 13 is provided with a rearwardly extending rod 27 which, when the carriage is at its low limit of travel, moves a deflectable lever 28, pivoted at 29, upwardly to throw a switch 30. This switch 30 may well be a double pole single throw switch of the type shown in the Patent 1,960,020 issued to P. K. McGall on May 22, 1934, and is mounted on a bracket 31 extending from a side plate 32 of the instrument. The bracket is of such a length that the switch is positioned over shaft 12 at a point above the low end of the chart 15. In this manner the switch is moved to one position as the pen carriage 13 reaches one end of its travel and the switch is moved to the other position as the pen carriage starts up-scale in response to a measurement of a billet 3 coming under device 4. Switch 30 may be slidingly mounted with respect to bracket 31 and fastened in the desired position thereupon by screws 30A. The bracket 31 may be long enough to position the switch 30 over any desired portion of the chart 15, as for example, by manual adjustment after loosening screws 30A. The switch is used to start and stop a motor or to reverse a motor which controls the chart drive mechanism in a manner now to be described.

Figure 4:
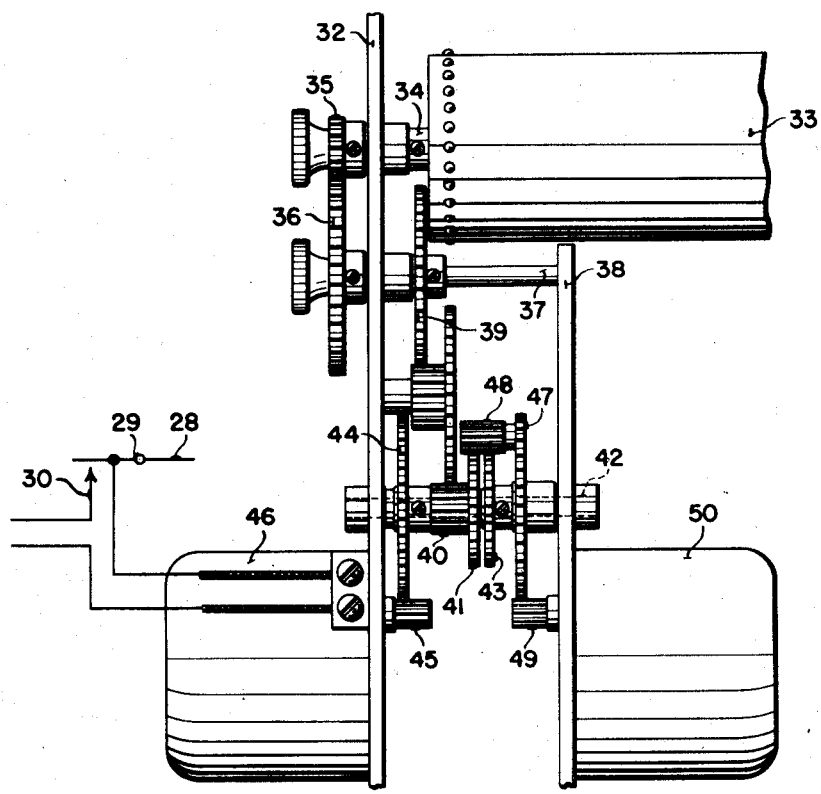
Fig. 4 is a view of one form of chart drive mechanism.

Referring to Fig. 4 it will be seen that a chart driving drum 33 is mounted on a shaft which is journaled at one end in the side plate 32 and has a gear 35 attached to its outer end. The gear meshes with a gear 36 that is attached to a shaft 37 journaled for rotation in the side plate 32 and a secondary supporting plate 38. The gears 35 and 36 may be removed from their respective shafts and be supplanted with other gears to change the speed ratio between shaft 37 and the shaft 34 upon which the chart drum is fastened. The shaft 37 is driven by a gear 39 which is driven through a pair of idler gears, as shown, from a pinion 40 which is attached to a gear 41, the latter being free to rotate on a shaft 42 which is journaled for rotation in plates 32 and 38. Attached to the shaft 42 are gears 43, which has one less tooth than gear 41, and gear 44 that is driven by a pinion 45 on the shaft of an intermittently rotated synchronous motor 46 that is mounted on side plate 32. Motor 46 is controlled by switch 30 as diagrammatically indicated in Fig. 4.

Also free to rotate on shaft 42 is a gear 47 that carries with it a pinion 48 meshing with the gears 41 and 43. The gear 47 is driven by a pinion 49 on the shaft of a constantly rotating synchronous motor 50 which is mounted on plate 38.

In the operation of the device assume that the pen carriage is at the lower left end of the scale and that rod 27 has moved lever 28 upwardly to open switch 30 and stop motor 46. Under these conditions the motor 46 is holding gears 43 and 44 from rotating. Therefore, as motor 50 rotates it will drive gear 47, and the pinion 48 carried thereby will walk around gear 43 to advance gear 41 the distance of one tooth relative thereto for each revolution of the gear 47. The rotation of gear 41 is transferred by pinion 40 to the chart drum 33 to drive the said drum at a speed dependent upon the synchronous speed of motor 50.

If a billet moves under device 4 the motor 11 will be energized to move carriage 13 up-scale, thereby moving rod 27 from under lever 28 to permit switch 30 to close and energize motor 46. This motor will then drive gear 44 and consequently gear 43 in the same direction and at the same speed as gear 47 is being driven by motor 50. Since gears 47 and 43 are now rotating at the same speed the pinion 48 will not revolve and gear 41 will be rotated by the pinion at the same speed as gear 43. The rotation of gear 43 will be transferred to the chart drum 33 to drive it at a high speed. When the billet has passed beyond the range of the instrument the pen carriage will be returned to the low end of the chart and rod 27 will open switch 30 to stop motor 46 and the chart drum will resume its slow speed of rotation. Thus it will be seen that normally the chart is driven at a low speed but upon the occurrence of a large change in the value being recorded the chart will be driven at a high speed. Upon the cessation of the emergency or the return of the value of the condition being recorded to a predetermined low value the chart speed will immediately be slowed down.

Figure 7:
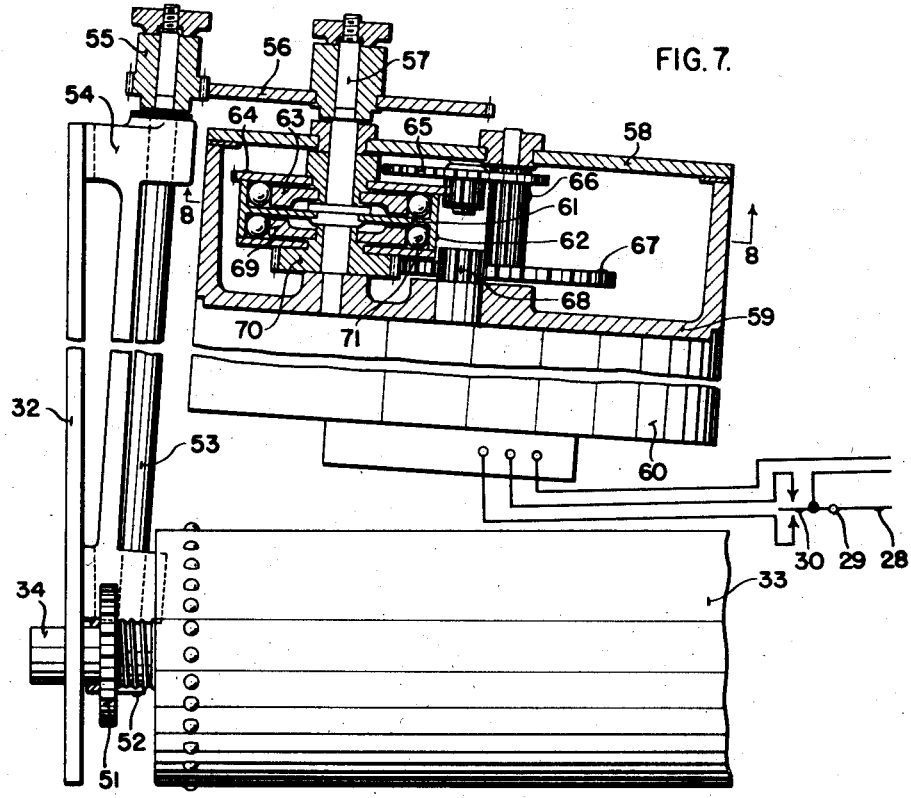
Fig. 7 is a view, partly in section, showing another form of chart drive.
Figure 8:
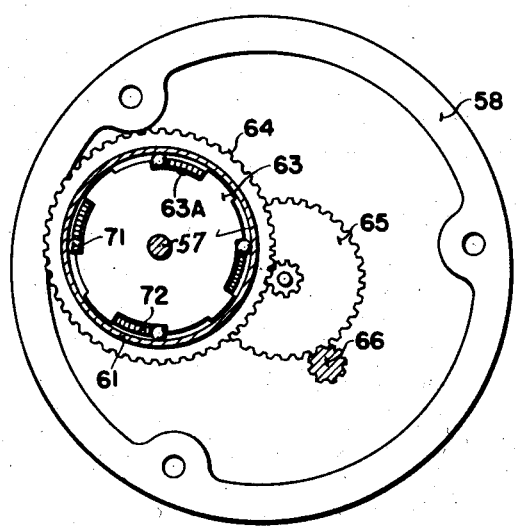
Fig. 8 is a view taken on line 8—8 of Fig. 7.

In Figs. 7 and 8 there is shown another type of multi-speed drive mechanism which may be used to drive the chart drum 33. In this embodiment of the invention the shaft 34 is provided with a worm gear 51 which meshes with a worm 52 on one end of a rotatable shaft 53 that is journaled in bearings formed in a bracket 54 attached to the side plate 32. The other end of the shaft 53 has keyed to it a gear 55 in mesh with a gear 56 keyed to a shaft 57. The gears 55 and 56 are removable from their respective shafts and may be supplanted with gears of a different size to change the ratio between shafts 53 and 57.

The shaft 57 is journaled in the cap 58 and base 59 of a casing, the base of which forms one end of a housing for a reversible motor 60 which is used to drive the drum 33. The motor housing may be mounted in any suitable manner in the instrument framework. Rigidly attached to the shaft 57 is a disc 61 that has integrally formed with it a web 62 that extends perpendicular to the disc and overhangs each side thereof. This web 62 forms the driven member in each of a pair of similar overrunning clutches.

The driving member of the clutch through which the low speed drive to the drum is transmitted consists of a disc 63 having cut-out portions 63A, the bases of which are nonconcentric with the shaft 57. The disc 63 is attached to a hub, to which is also attached a gear 64 that is driven through reduction gears 65, as shown, from a pinion 66 mounted for rotation with a gear 67 that is driven from a pinion 68 on the shaft of motor 60.

The driving member of the clutch through which the high speed drive to the drum is transmitted consists of a disc 69, shaped with cut-out portions like disc 63, rotatable with a gear 70. The gear 70 is driven directly by gear 67 and pinion 68. In each of the clutches balls 71 are placed in the cut-out portions of the clutch discs 63 and 69 and springs 72 are provided to resiliently force the balls 71 to the shallow end of the cut-out portions 64. The balls 71 transmit motion from the driving to the driven member of the clutch.

In the operation of this embodiment of the chart drive assume that the pen carriage 13 is at the low portion of the scale and that rod 27 has moved lever 28 upward to throw the switch 30 to a position where the motor will run, for example, forward. The disc 63 will then be driven in a direction to wedge the balls 71 between the shallow end of the cut-out portions 63A and web 61. The web will therefor be pulled forward to rotate shaft 57 and the chart drum. This rotation of the chart drum will be slow because of the reduction produced by gears 65 and pinion 66. At this same time the disc 69 is rotating in a reverse direction, or a direction tending to move balls 71 toward the deep end of its cut-out portions, and is thereby having no driving effect upon the web 61.

Upon movement of the pen carriage 13 toward the high portion of the chart, or to the right in Fig. 1, the shaft 27 will permit lever 28 to move downwardly so that switch 30 can reverse the motor 60. Upon the reversal of the motor 60 the disc 69 becomes the drive member and it is driven at a high speed from gears 70, 67 and 68. The balls 71 of this clutch member are then wedged against web 61 to pull that web around and rotate shaft 57 and through the gearing, drum 33. At this time the disc 63 is rotating in a reverse direction and the balls 71 in engagement therewith are tending to move toward the deep end of slots 63A so that they have no effect on the web 61. When the pen carriage moves back to the low end of the chart the switch 30 will be actuated to immediately reverse the motor 60 so that the chart drum will resume its slow speed.

By the use of the above described arrangement the speed of the chart is varied in accordance with the value of the condition and as soon as the emergency has passed the chart is slowed down to a normal rate. This prevents unnecessary waste of the chart inasmuch as it is not run at a high speed any longer than necessary. In the ordinary instrument in which the chart is provided with horizontal time lines such an arrangement would render them useless because of the irregular changes of chart speed. In order to overcome this necessary disadvantage I provide as part of my invention a device to mark on the chart the time of day at periodic intervals, so that the time any part of the record was made may be easily ascertained. When the multi-speed chart drive and time printing mechanism are used together on the same instrument a high speed legible and easily interpreted record line is produced. The normal horizontal lines may, if desired, be retained on the chart to be used for convenience in interpolating the time of the readings between the periodically printed time marks. It is preferable that the high speed drive have some definite relation to the low speed drive, such as a speed in inches per hour at low speed and the same number of inches per minute at high speed.

There is shown in Figs. 9 to 12 one form of time printing mechanism that may be used, and the drive means therefor. Referring first to Fig. 9 there is shown in dotted outline a synchronous motor 73 that has on its drive shaft a pinion 74 which, through gearing now to be described, drives the printing mechanism. The pinion 74 meshes with and drives a gear 75 which carries a pair of pawls 76 that are spring pressed into engagement with a ratchet 77 which is fast on shaft 78. The gear 75 is loosely journaled on the shaft 78, the arrangement being that the shaft 78 may be rotated if desired by some manual means, such as a knob in the end of the shaft, faster than it is normally driven by motor 73.

Fastened to the shaft 78 is a pinion 79 that meshes with and drives a gear 80 and pinion 81. The gear 80 drives a pinion 82, attached to one end of a shaft 83, to the other end of which is fastened a disc 84 having a slot 84A in it. Rotatable on the shaft 83 is a cam 85 that is adjustably secured to the disc 84 by means of a screw extending through the slot 84A and into the cam. The arrangement is such that the cam 85 is driven at a fairly high speed from the gear 75. The pinion 81, driven with gear 80, meshes with and drives a gear 86, that along with a gear 87 and a cam 88, is attached to a sleeve 89 which rotates on the shaft 83. In this manner, the cams 85 and 88 are mounted side by side and rotated at different speeds, the cam 85 rotating faster than the cam 88.

A supporting plate 90 for the printing mechanism per se is pivoted at 91 to the right hand side plate 92 of the instrument. The lower edge of plate 90 is bent as shown at 90A and is also provided with a roller 93. The plate 90 is biased by gravity and a spring 91A to hold the edge 90A and roller 93 in engagement with the cams 85 and 88 so that as the cut-out portions 85A and 88A of the cams 85 and 88, respectively, move under the edge and roller the plate 90 will be permitted to move clockwise to bring the time printing characters into engagement with chart 15. The cams 85 and 88 are so adjusted relative to each other that periodically, say every five minutes, the leading edges of their cut-out portions will simultaneously move in a clockwise direction past edge 90A so that a printing operation may take place. Almost immediately thereafter the cam 85 rotating at high speed, engages roller 93 to move the plate 90 counter-clockwise to lift the print wheels out of engagement with the chart 15. This is accomplished before the chart, if moving at a high speed, can blur the printing and before the following edge of cut-out 88A can come under roller 93 and edge 90A, to hold plate 90 in non-printing position for another period.

Figure 11:
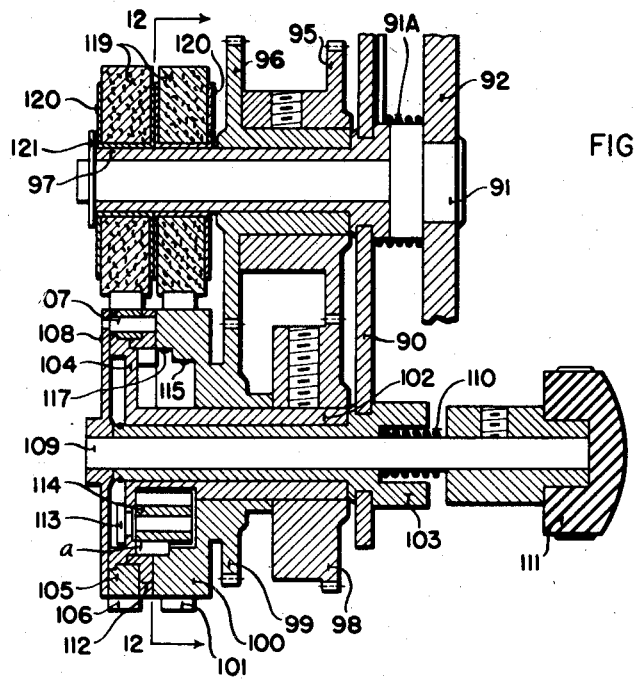
Fig. 11 is a section view taken on line 11—11 of Fig. 9.
Figure 12:
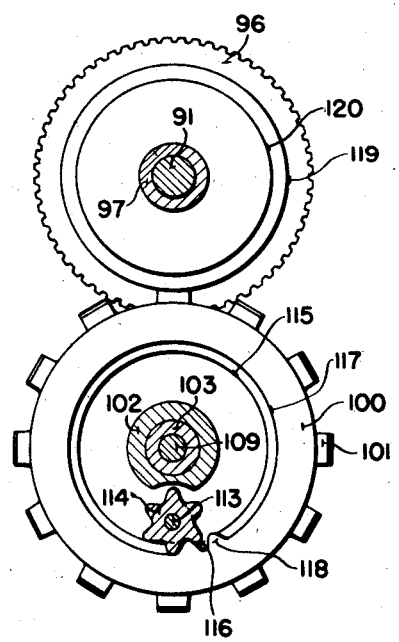
Fig. 12 is a section view taken on line 12—12 of Fig. 11.

The gear 87 meshes with a gear 94, rotatable around the threaded shaft 12, which gear drives the printing mechanism that is more clearly shown in Figs. 10 to 12. Meshing with and rotated at a constant speed by gear 94 is a gear 95 that is attached to a gear 96, both of the latter being rotatable around a sleeve 97 on pivot pin 91. It is noted that plate 90 is attached to the sleeve 97 so that the sleeve 97 and plate 90 oscillate together around pin 91 to perform the printing operation. The gears 95 and 96 are of slightly different diameters and they drive gears 98 and 99, respectively, at such relative speeds that the gear 99 rotates one and one-twelfth times for each rotation of the gear 98. The gear 99 is shown as being integrally formed with a minute print wheel 100 that has twelve printing characters 101 formed on its surface. The speed of rotation of the print wheel is such that it is driven from motor 73 through the above described gear train at a rate of one and one-twelfth revolutions each five minutes. In this manner a different printing character is brought into printing position every five minutes.

The gear 99 rotates on a sleeve 102 that is attached to and rotated by the gear 98, and the sleeve revolves around a tubular journal 103 which is rigidly attached to plate 90. Rotatably supported by a web or disc 104 formed on the end of sleeve 102 and extending radially therefrom is an hour print wheel 105 that is provided on its periphery with printing characters 106. This print wheel 105 is formed as an annular member and is provided with a series of openings in it through which extend pins 107 that are attached to a disc 108 mounted on shaft 109. The shaft extends through the hollow journal 103 and is biased toward the right to maintain pins 107 in the print wheel 105 by means of a spring 110 bearing at one end against journal 103 and at its other end against a knob 111 on the shaft. The pins 107 also extend into openings in an annular internal gear 112 that is mounted on the web or disc 104 beside the print wheel 105. The gear 99 drives the hour print wheel 105 at the speed of one revolution every five minutes so that every five minutes the same character 106 is in printing position.

From the above it will be seen that the same printing character on the hour wheel will continuously return to printing position while a new character on the minute wheel will be placed in printing position at the end of each interval of five minutes. Means are provided to advance the hour wheel one-twelfth of a revolution relative to the minute wheel at the end of every twelve printing operations, or at the end of each hour. This is accomplished in the following manner.

The disc 104 is provided with a small stud shaft 113 extending therefrom, upon which is journaled a small pinion 114 having six teeth every other one of which is shorter than those adjacent it as shown at $a$ in Fig. 11. The interior of print wheel 100 is formed in cross-section with a step 115 in which is formed one depressed gear tooth 116 and with a step 117 in which are formed two raised gear teeth 118, the depression 116 being located in between the teeth 118. Normally two long teeth of the pinion 114 are resting on the step 115 while the intermediate short tooth is extending downwardly toward the step 117. In this manner the pinion 114 is normally locked against rotation and since its teeth are at all times in mesh with those of internal gear 112, that gear and the hour print wheel attached thereto by pins 107 are prevented from rotating with respect to their driving shaft, sleeve 102.

During the operation of the device between the times the hour wheel is to be stepped forward relative to the minute wheel, the long teeth of the pinion 114 rest on step 115. Since the hour and minute wheels are rotating at different speeds the pinion 114 will be held from rotation but will slide on the faster rotating steps 115 and 117. At the end of every twelve revolutions of the hour wheel the minute wheel will have advanced one complete turn relative thereto and during the next revolution teeth 116 and 118, formed in the steps, will move under the pinion to revolve it on shaft 113. This will, due to the meshing of pinion 114 and gear 112, force that gear along with the print wheel 105 and disc 108 ahead of disc 104 for one-twelfth of a revolution to bring the next hour printing character 106 into printing position.

In order to supply ink to the printing wheels a pair of felt ink pads 119, held in metal supports 120, are loosely mounted on the sleeve 87. The ink pads are held in place by a washer 121. As the print wheels rotate the ink pads are rotated with them to continuously keep the printing characters moist so that a good impression will be made on the chart.

In the operation of the printing mechanism the motor 73 rotates at a constant speed and drives the cams 85 and 88 past edge 90A. At the same time the motor 73 is rotating the print wheels 100 and 105. The gearing is so adjusted that every time the low portions of the cams come under edge 90A a pair of printing characters, one on each print wheel, are in printing position. Thereafter as edge 90A falls off the cams a recording of the time is made on the chart. At intervals of five minutes new printing characters will be brought into printing position and the cams will have rotated to again bring their low portions under edge 90A to repeat the operation. It will be obvious that the gearing and print wheel mechanism above described may be altered so that the time may be printed on the chart at other intervals of time rather than the five minute intervals above described.

Provisions are made for setting the print wheels so that they will print the proper time of day regardless of their position when the instrument was started. As has been described above the motor 73 drives gear 75 which is loose on shaft 78 and which drives the rest of the gear train through pawls 76 and ratchet 77. By turning shaft 78 by hand faster than the gear 75 is rotated, the print wheels can quickly be rotated to place the proper minute printing character in printing position. Thereafter if knob 111 and shaft 109 are moved to the left in Fig. 11 against the tension of spring 110, the pins 107 on disc 108 will be moved out of engagement with internal gear 112. Knob 111 can now be rotated and through disc 108 and pins 107 the print wheel 105 may be rotated relative to print wheel 100 to place the proper hour character 106 in printing position over the chart.

In order to facilitate the adjustment of the print wheels each of them is provided with numbers on its surface, between the characters 101 and 106, angularly displaced from the latter an amount so that when a character 101 or 106 is in printing position the corresponding number will be opposite a pointer 122 located at a readily visible position on plate 90. In setting the wheels the shaft 78 is first manually rotated until the proper number on wheel 100 is opposite pointer 122 thus indicating that the proper character 101 is in printing position. Thereafter knob 111 is pushed to the left and rotated until the proper number on wheel 105 is opposite pointer 122 to indicate that the proper character 106 is in printing position. If desired a mark 123 may be placed on the shoulder of gear 98 in such a position that just as the printing operation is to take place the mark 123 will be centered in an opening in the pointer. This may then serve as an indication that a printing operation is about to take place.

Switches may be located at the front of the instrument above the chart and pen mechanism to control the various motors that drive the element of the instrument. Such switches have been shown in Fig. 1.

From the above description it will be seen that I have provided a mechanism which, when used in a recording instrument, will produce an extremely legible and well correlated record.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometime be used to advantage without a corresponding use of other features.

Having now described my invention, what I claim as new and desire to secure by Letters Patent is:

1. In a measuring instrument, the combination of a measuring device having a chart, a multi-speed driving mechanism for the chart normally operating at one of its speeds, a recording device for said chart, means to move said recording device across said chart in response to measurements of said measuring device, and means to change the speed of said driving mechanism in response to a predetermined movement of said recording device from a given point in its path of travel.

2. In a measuring instrument, the combination of a measuring device having a chart, a multi-speed drive therefor normally operating at a slow speed, a recording device for indicating on said chart the value of the measurement made by said measuring device and means responsive to movements of said recording device across said chart toward higher values to speed up said chart drive.

3. In a measuring instrument having a chart, a measuring device, a recording device movable transversely of the chart in accordance with measurements made by said measuring device, a two-speed drive for the chart, control means for said drive located in the path of movement of said recording device and adapted to be actuated thereby, whereby as said recording device passes said control means the control means will be actuated to vary the speed of the chart drive.

4. In a measuring instrument having a chart, the combination with a measuring device, of a recording device shifted across the chart in response to measurement made by said measuring device, and means to drive said chart at one speed when the recording device is over one section of the chart and to drive said chart at another speed when the recording device is over another section of said chart, said drive means being controlled by movement of said recording device from one section of the chart to the other section.

5. In a measuring instrument having a chart, the combination of drive means for the chart, said drive means comprising a multi-speed drive mechanism and gearing continuously connecting said mechanism to the chart drive means, a recording device for the chart and means responsive to the position of said recording device across the chart to change the speed at which the chart is driven by the said drive means.

6. In an instrument of the type that is provided with a chart upon which a record is to be made of the value of a condition as the result of a measurement made by an electrical measuring circuit and which is provided with a means to periodically print the time of day on the chart, the combination of a recording device to record the value of the condition on the chart in response to variations in the value of the condition being measured, variable speed means to drive the chart, a switch located in the path of movement of said device to be operated as said device passes it, and means operable in response to actuation of said switch to change the speed at which the chart is driven.

7. In a recording instrument provided with a chart that is adapted to be driven at different speeds and to have recorded upon it the value of a condition as measured by an electrical measuring circuit and also to have recorded upon it at periodic intervals, regardless of the speed of the chart, the time of the day by a clock mechanism carried on the instrument, the combination of a recording device adapted to be moved transversely of the chart, means to move said recording device in response to variations in the value of the condition being measured, a two-speed drive means for said chart, a part located in the path of movement of said device and adapted to be moved thereby as said device passes said part, and means controlled by movement of said part to change the speed at which said drive means drives the chart.

JOHN A. CALDWELL.